W. S. HARLEY.
FRONT FORK CONSTRUCTION.
APPLICATION FILED OCT. 15, 1917.
1,264,643.
Patented Apr. 30, 1918.
2 SHEETS—SHEET 1.
Fig. 1.
Fig. 2.
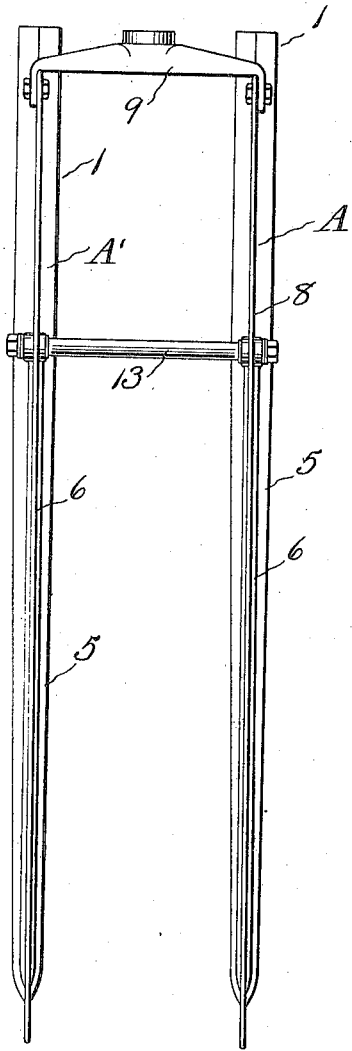
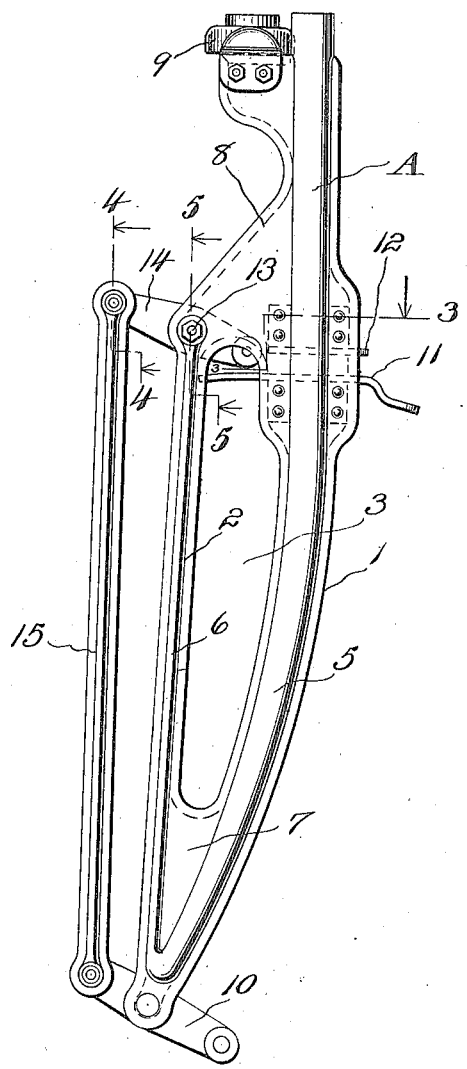
Inventor
William S Harley
Geo W Young
Attorney
Witness
J. P. Brett
By

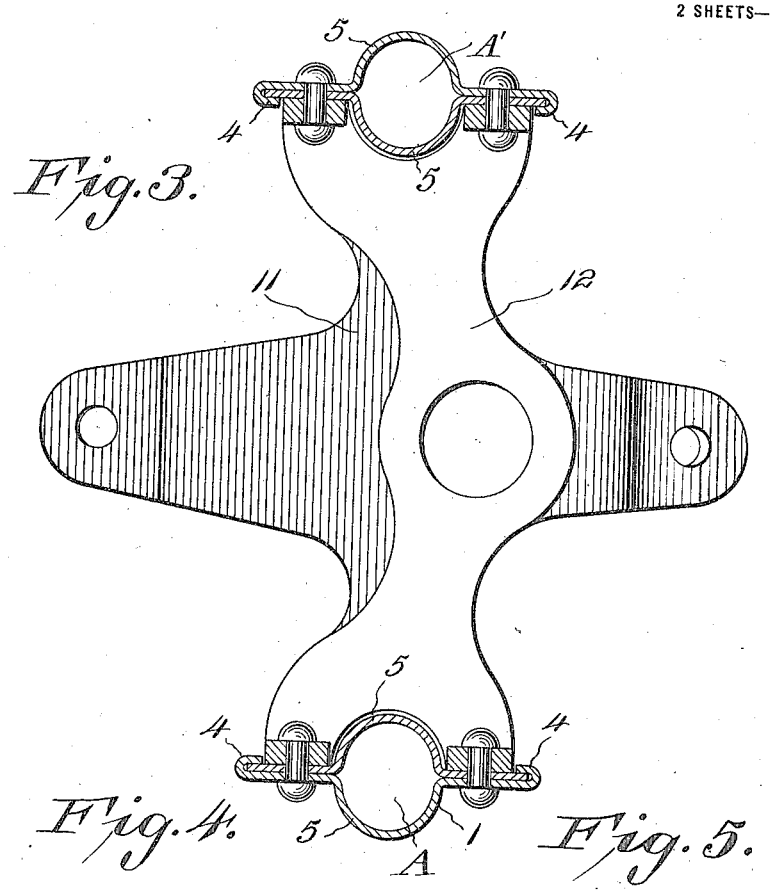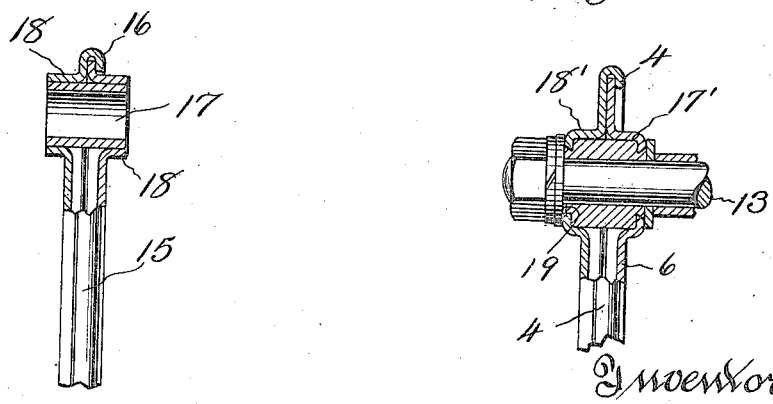

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

FRONT-FORK CONSTRUCTION.

1,264,643.

Specification of Letters Patent.

Patented Apr. 30, 1918.

Application filed October 15, 1917. Serial No. 196,632.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Front-Fork Construction; and I do hereby declare that the following is a full, clear, and exact description thereof.

My present invention is a companion application to applications numbered 196,630 and 196,633, and refers to new and useful improvements in the manner of constructing vehicle frames, particularly those for bicycles and motorcycles. This application relates specifically to the construction of front forks for motorcycles.

I have set forth in the first of the above mentioned co-pending applications that the object of these several inventions is to provide a new manner of constructing motorcycle and bicycle frames of light gage sheet metal. In the present invention the structure illustrated in Patent No. 1,254,798, has been modified to allow the same to be stamped from sheets of metal which are connected together in such a manner as to procure a very light, yet extremely strong and durable front fork.

With this general object in view the invention resides in the novel features of construction, which will be hereinafter more particularly described and claimed and shown in the drawing, wherein:—

Figure 1 represents a front view of the main portion of a spring motorcycle fork, certain parts, which are shown in Fig. 2, having been removed for the sake of clearness in illustration.

Fig. 2 is a side elevational view of a front fork constructed in accordance with my invention.

Fig. 3 is a horizontal section taken substantially on the plane of the line 3—3 of Fig. 2.

Fig. 4 is a detail vertical section of one end of one of the pivoted links, said section being taken approximately on the line 4—4 of Fig. 2, and Fig. 5 is a similar view of one end of one of the supplemental fork bars, said section being taken approximately on the line 5—5 of Fig. 2.

As in said Patent No. 1,254,798, the fork is preferably constructed of a pair of main fork bars 1 and a pair of supplemental fork bars 2, the last mentioned bars being connected at their opposite ends with the adjacent main fork bars 1. In the present application each supplemental fork bar is preferably formed integrally with the adjacent main fork bar, whereby to provide a pair of side members A and A', which are connected together to form the principal portions of the fork.

Inasmuch as each of the side members A and A' is constructed substantially alike, the description of the specific formation of one will be sufficient. Therefore, the steps in the construction of the side member A will be more particularly explained. In making the same, two pieces of sheet metal are necessary and each is cut into similar outline, each being provided with a centrally elongated opening 3. The two sections thus formed from the two sheets of metal are adapted to be disposed in abutting relation and secured in this position by bending the edge portion of one section upon itself and into engagement with the adjacent portion of the other section, as shown at 4, this result being readily attainable inasmuch as one of the sections is slightly larger than the other. When the edges are thus tightly clamped together, the sections will be positively held against movement with respect to each other.

Before the sections are united, however, they are reinforced by having ribs stamped or pressed therein, these ribs in one section coinciding with those in the other whereby to procure main and supplemental fork bars hereinbefore referred to. The sections are stamped outwardly in forming these bars, as shown at 5 and 6, whereby certain portions of the sections are substantially tubular in cross section. As shown most clearly in Fig. 2 the rib 5 in each section is on one side of the opening 3 and extends longitudinally throughout the length thereof and is curved slightly at its lower end, while the rib 6 is on the other side of the opening 3 and extends only a portion of the length of the section. The lower end of the ribs 5 and 6 merge and the other end portions are disposed approximately parallel.

The lower ends of the main and supplemental fork bars are connected together and are reinforced by a web 7, as in Fig. 2. The end of the supplemental bar terminates intermediate the ends of the main fork bar and is connected therewith by a web 8.

After the formation of the sections A and A′, they are united, as shown in Fig. 1, the upper ends of the main fork bars being connected by a head plate 9 whose opposite ends are bent downwardly or laterally and are secured by bolts to the web 8. The lower ends of the sections are pivoted intermediate the ends of levers 10 which carry the front axle. The sections are further connected intermediate their ends at a plurality of points, first by a bottom plate 11 and an intermediate plate 12 and, also, by a rod 13. The rod extends through the sections at the ends of the supplemental fork bars, while the plates 11 and 12 are riveted to the inner section of each main fork bar or the portion of the plates immediately surrounding the same. The several plates 9, 11 and 12 in the present application are substantial counter-parts of similar plates 9, 10 and 12 shown in the co-pending application last referred to and are used for the same purpose as in that application.

The rod 13 in addition to holding the two side members together is also adapted to form a pivot for a pair of levers 14. The outer ends of these levers 14 are connected with the levers 10 by means of links 15 which are pivoted at their opposite ends thereto. Each of the links is formed of two pieces of sheet metal, these being provided with a longitudinal reinforcing rib, the material on each side of these ribs forming flanges whereby they are attached together. The flanges of one of the pieces of sheet metal are considerably wider than the flanges of the other and are adapted to be bent upon themselves and into engagement with those of the other pieces, as shown at 16 in Fig. 4. Thus the links are constructed and connected together substantially as the sections forming the main and supplemental fork bars.

Under some circumstances it is necessary to reinforce the sheet metal parts, particularly where bolts or the like extend therethrough, such reinforcing being procured as shown in Figs. 4 and 5. Fig. 4, which is a section through one end of one link 15 at the point of its attachment with the lever 14, is provided with a bushing 17, which extends through an aperture formed in each of the pieces of material from which the link is constructed after the material immediately surrounding said apertures has been turned outwardly, as at 18.

In Fig. 5 a more secure means for holding the bushing 17′ in place is adapted. In this form of reinforcing the material surrounding the apertures is also extended outwardly, as at 18′, but it is also bent laterally inwardly into engagement with the annular grooves 19 formed in the periphery of the bushing adjacent the ends thereof. These reinforcing bushings are used wherever an unusual strain or much friction is liable to occur.

From the foregoing description taken in connection with the accompanying drawings, it will be seen that an extremely simply constructed front motorcycle fork may be formed of light gage metal, this construction being not only much less expensive than the usual manner of forming motorcycle forks, but also very much lighter.

I claim:—

1. A front fork for motorcycles and the like including a pair of side members, each of said side members being formed of two sections, each comprising an elongated single sheet of material having a longitudinally disposed centrally positioned elongated opening, a longitudinally extending rib formed by stamping the sheet of material outwardly, said rib being disposed on one side of said opening and extended throughout the length of the sheet, a second similar rib of less length than the first mentioned rib and disposed on the other side of said opening, the lower ends of the ribs being merged and their upper end portions disposed approximately parallel, means for connecting the sheets of material forming the corresponding sections together whereby the first mentioned ribs will form main fork bars and the last mentioned ribs supplemental fork bars, and means for connecting the side members together.

2. A front fork for motorcycles and the like including a pair of side members, each being formed of two sections, each of said sections being stamped from single sheets of material to form corresponding coöperating halves of the main fork bars and supplemental fork bars, a plate connecting the inner adjacent sections of the fork bars, a connecting member joining the upper ends of the main fork bars, and a rod connecting the side members adjacent the upper ends of the supplemental fork bars.

3. A frame for motorcycles or the like formed of tubular material and having alined apertures formed through opposite sides thereof, the material surrounding said apertures extending outwardly to increase the size of said apertures, and a bushing extending through said apertures, said bushing having its periphery adjacent its opposite ends annularly grooved, the free edges of the material surrounding the apertures being bent into said grooves.

In testimony that I claim the foregoing I have hereunto set my hand at Milwaukee, in the county of Milwaukee and State of Wisconsin.

WILLIAM S. HARLEY.

Copies of this patent may be obtained for five cents each, by addressing the "Commissioner of Patents, Washington, D. C."